Patented Dec. 8, 1942

2,304,427

UNITED STATES PATENT OFFICE 2,304,427

RECOVERY OF SILVER FROM SCRAP FILMS

Robert L. Sibley, Nitro, W. Va., assignor to Monsanto Chemical Company, St. Louis, Mo., a corporation of Delaware No Drawing. Application June 5, 1941,
Serial No. 396,741

4 Claims. (Cl. 75—118)

This invention relates to the treatment of photographic films and the like for the recovery of silver.

The principal feature of the invention consists in the conversion of the silver directly into a soluble form without first re-converting the reduced silver to silver halide.

According to this invention the silver is dissolved from the waste photographic film by treating with a solution of thiourea. While the nature of the chemical reaction taking place is not thoroughly understood it has been found that the silver is dissolved by the thiourea solution from which it may be recovered by known means.

In carrying out the process waste photographic film is immersed in an aqueous solution of thiourea at either room or elevated temperatures. The conversion of the silver into soluble form is found to be complete approximately when the black portions of the exposed film disappear and the film is rendered white or transparent. The concentration of the thiourea is not at all critical. Very satisfactory results have been obtained with from three to ten percent thiourea by weight but solutions of different strength may be used where convenient. However, the time consumed in the dissolution is noticeably longer in the case of dilute thiourea solutions so that it is preferred to use solutions which approach saturation.

The silver may be recovered from solution in which it exists probably in some form of complex combination with the thiourea, by deposition on a suitable metal, preferably mossy zinc. Obviously other methods of precipitating the silver may be used. Thus, the silver may be removed in the form of sulfide or recovered direct from the thiourea solution by electrolysis.

As specific embodiments of the invention, aqueous solutions of 2, 3, 5 and 10 percent by weight thiourea were prepared and waste photographic film immersed therein. The black silver deposit soon began to disappear and when the film was clean and transparent it was removed from the bath. While the time that the film must remain in contact with the treating bath is subject to many variables and can not be stated definitely it was found that merely standing at room temperature for one to two days was sufficient to complete the dissolution of the silver in the dilute (2 and 3 percent) thiourea solutions. The dissolution was materially faster in the more concentrated solutions and it was found that it could be further hastened by warming the bath and/or mechanical stirring. Mossy zinc was then added to the silver solutions and the silver soon precipitated on the zinc surfaces.

The invention is not limited to the specific embodiments described above. Many changes and modifications may be made and the invention embodied in widely different forms. Molecular silver can be recovered by the process described from moving picture film or any other scrap photographic film or plate.

The present invention is limited solely by the claims attached hereto as part of the present specification.

What is claimed is:

1. A process for treating waste photographic films and the like for the recovery of silver which comprises converting the silver into soluble form by treating with a solution consisting of thiourea in water.

2. A process for treating waste photographic films and the like for the recovery of silver which comprises converting the silver into soluble form by heating with a solution consisting of at least two percent thiourea in water.

3. A process for treating waste photographic film and the like for the recovery of silver which comprises converting the silver into soluble form by treating with a solution consisting of at least two percent thiourea in water and precipitating the silver on mossy zinc.

4. A process for treating photographic films and the like for the recovery of silver which comprises converting the silver into soluble form by treating with an aqueous thiourea solution and precipitating the silver on mossy zinc.

ROBERT L. SIBLEY.